United States Patent
Smith et al.

(10) Patent No.: US 10,464,176 B2
(45) Date of Patent: Nov. 5, 2019

(54) FIRE TUBE INSTALLATION AND REMOVAL TOOL

(71) Applicants: Michael Smith, San Angelo, TX (US); Pete Smith, San Angelo, TX (US); Ramon Garza, San Angelo, TX (US); Joe Sanchez, San Angelo, TX (US)

(72) Inventors: Michael Smith, San Angelo, TX (US); Pete Smith, San Angelo, TX (US); Ramon Garza, San Angelo, TX (US); Joe Sanchez, San Angelo, TX (US)

(73) Assignee: WTX Oil Fields Services, LLC, San Angelo, TX (US)

( * ) Notice: Subject to any disclaimer, the term of this patent is extended or adjusted under 35 U.S.C. 154(b) by 310 days.

(21) Appl. No.: 15/614,772

(22) Filed: Jun. 6, 2017

(65) Prior Publication Data
US 2018/0345426 A1 Dec. 6, 2018

(51) Int. Cl.
*B23P 19/02* (2006.01)
*B66C 1/56* (2006.01)
(Continued)

(52) U.S. Cl.
CPC .............. *B23P 19/022* (2013.01); *B23P 6/00* (2013.01); *B23P 19/024* (2013.01); *B66C 1/56* (2013.01);
(Continued)

(58) Field of Classification Search
CPC ..... B23P 19/022; B23P 19/024; B23P 19/025; B23P 19/12; B23P 19/10; B23P 6/00;
(Continued)

(56) References Cited

U.S. PATENT DOCUMENTS 2,778,671 A * 1/1957 Langston .................. B66C 1/56
                                                     294/95
3,180,498 A * 4/1965 Postlewaite ........... B23P 19/024
                                                     254/106
(Continued)

FOREIGN PATENT DOCUMENTS

CN         201135996 Y    10/2008
CN         201209157 Y     3/2009
(Continued)

*Primary Examiner* — Jermie E Cozart
(74) *Attorney, Agent, or Firm* — Grady K. Bergen; Griggs Bergen LLP (57) ABSTRACT

A tool is provided for removal and installation of a fire tube that extends into an opening in a wall of a heating vessel. The fire tube locates within an interior of the heating vessel when mounted thereto. The fire tube has a tube wall that defines a tube interior and has a mounting end for mounting the fire tube to the wall of the heating vessel. The tool has an elongated main shaft member having an insertion end and an opposite control end. A first support is mounted upon the insertion end that is configured for being closely received within the tube interior. A second support is mounted along the length of the main shaft member, the second support having a fire tube interface configured for engaging and releasably coupling to the mounting end of the fire tube. A lift coupling couples to the main shaft and locates between the second support and the control end of the main shaft member for coupling to a lift line. A counterbalance support carries removable weighting members, the counterbalance support being coupled to the main shaft by a counterbalance support spacing arm that extends laterally from the main shaft member.

20 Claims, 6 Drawing Sheets

(51) Int. Cl.
  *B66C 1/62* (2006.01)
  *F22B 37/58* (2006.01)
  *B66C 1/10* (2006.01)
  *B23P 6/00* (2006.01)

(52) U.S. Cl.
  CPC .... *B23P 19/025* (2013.01); *B65G 2201/0276* (2013.01); *B66C 1/105* (2013.01); *B66C 1/62* (2013.01); *F22B 37/58* (2013.01); *Y10T 29/49819* (2015.01); *Y10T 29/49998* (2015.01); *Y10T 29/53113* (2015.01)

(58) Field of Classification Search
  CPC ....... B65G 2201/0276; Y10T 29/49819; Y10T 29/49998; Y10T 29/53117; Y10T 29/53113; B66C 1/56; B66C 1/62; B66C 1/105; F22B 37/58

See application file for complete search history.

(56) References Cited

U.S. PATENT DOCUMENTS

| | | | | |
|---|---|---|---|---|
| 3,239,076 | A | * | 3/1966 | Huff ..................... B23P 19/024 254/29 R |
| 3,257,001 | A | * | 6/1966 | Postlewaite .......... B23P 19/024 254/100 |
| 5,431,470 | A | * | 7/1995 | Magerl .................. B66C 1/105 294/67.2 |
| 8,979,148 | B1 | * | 3/2015 | Hatton, II ............... B66C 1/105 212/196 |
| 2002/0050724 | A1 | * | 5/2002 | Tsimmerman .......... B66C 1/105 294/67.5 |
| 2016/0096712 | A1 | | 4/2016 | Madron |

FOREIGN PATENT DOCUMENTS

| | | |
|---|---|---|
| CN | 201834952 U | 5/2011 |
| CN | 102556906 A | 7/2012 |
| CN | 202508744 U | 10/2012 |
| CN | 103937955 A | 7/2014 |
| CN | 103954134 A | 7/2014 |
| CN | 102002569 A | 4/2016 |
| GB | 250185 A | 1/1927 |

\* cited by examiner

FIRE TUBE INSTALLATION AND REMOVAL TOOL

BACKGROUND

Figure 1:
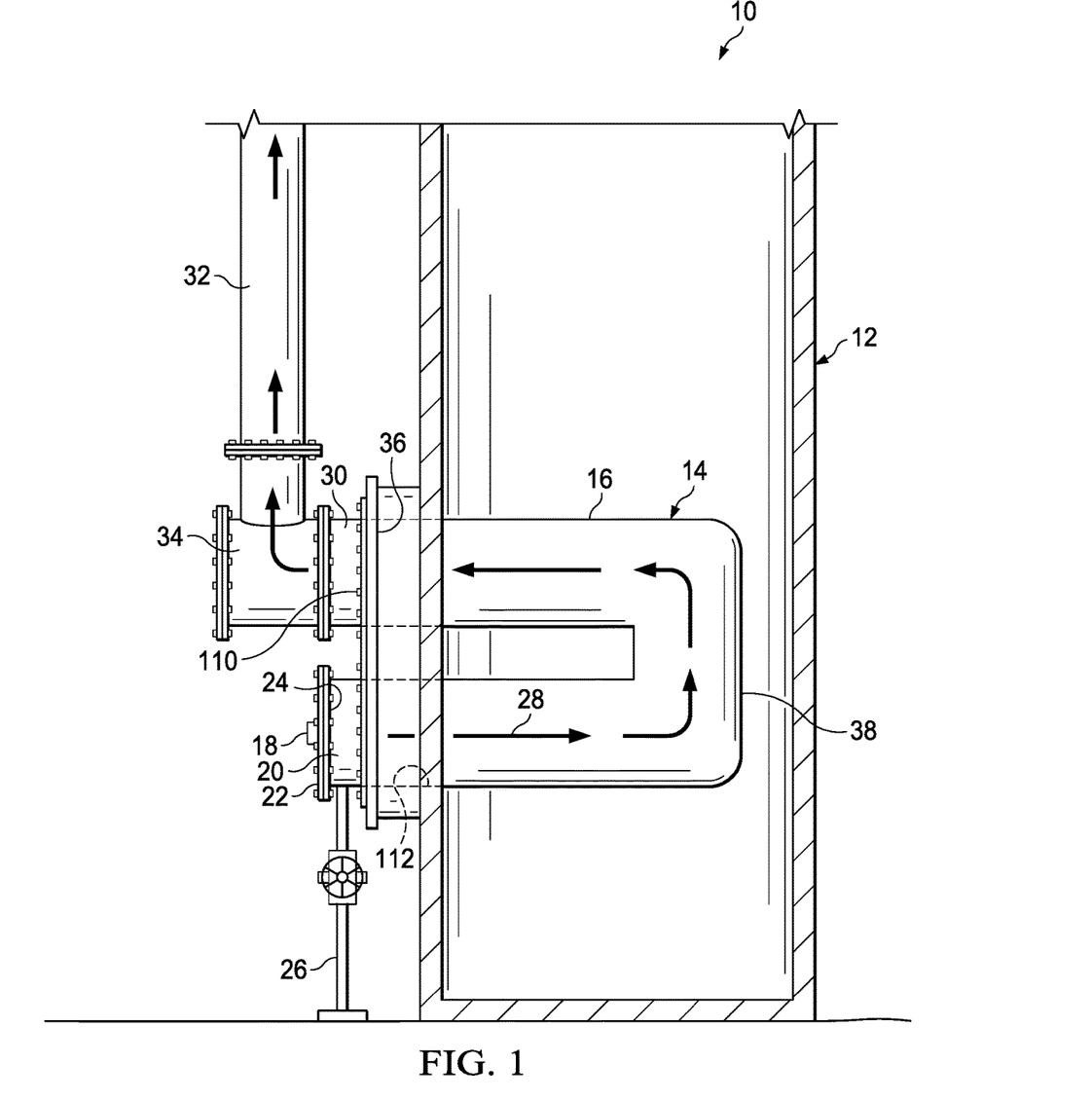
FIG. 1 is an elevational view of a heater treater employing a fire tube assembly, shown with a heater treater vessel of the heater treater in cross section.

Referring to FIG. 1, an exemplary heater treater 10 is shown for heating recovered oil well fluids so that the oil can be accepted by the pipeline. Such heater treaters 10 facilitate the breaking of oil and water emulsions and facilitate the separation of oil, water and gas.

The heater treaters 10 typically employ a heater treater vessel 12 that may be oriented vertically, as is shown, or horizontally. A fire tube assembly 14 is formed as a continuous U-shaped conduit or fire tube 16 that extends into the interior of the vessel 12 for heating of well fluids within the heater treater vessel 12. A burner/igniter 18 is provided at an inlet 20 of the fire tube 16. The burner/igniter 18 may be mounted at the inlet 20 through endcap 22 that is bolted or fastened to a mounting flange 24 at the inlet 20 of the fire tube 16. The inlet 20 receives fuel gas from fuel line 26, which is ignited and combusted within the fire tube 16 by means of the burner/igniter 18. Hot combustion gases pass through the fire tube 16, as indicated by the arrows 28, to facilitate heating of fluids within the heater treater vessel 12. Exhaust gases are discharged through outlet 30 of the fire tube 16 and exhausted through exhaust pipe 32, which is shown connected to the outlet 30 through conduit elbow 34.

The fire tube assemblies of heater treaters, such as the fire tube assembly 14, must be maintained and replaced often, requiring frequent removal and installation. Currently, installation and removal of the fire tube assemblies, such as the assembly 14, is a difficult process. The fire tube assembly 14 is fairly large, typically having a length of 4 to 6 feet, and typically weighs several hundred pounds. The fire tube assembly 14 is secured at a proximal mounting end to an opening in the heater vessel 12 by means of mounting flange 36 that surrounds the opening formed in the vessel 12 and to which the fire tube assembly 14 is bolted or fastened and thus supported. The opposite distal end 38 of the fire tube 16 projects into the vessel 12 from the mounting flange 36 and is typically free or unsupported.

To facilitate removal and installation of the fire tube assembly 14, with the exhaust conduit 32 uncoupled from the elbow 34 and the fuel line 26 uncoupled from the inlet 20 of the fire tube 16, as well as other structures connected to the fire tube assembly 14, a line, rope or strap, which may be attached to a hoist, crane or other support structure, is commonly secured to the outlet end 30 of the fire tube assembly 14 to facilitate its removal and installation. When the fire tube assembly 14 is unbolted or unfastened from the mounting flange 36 of the heater treater vessel 12, the free or unsupported end 38 of the fire tube 16 will tend to drop or dip down within the vessel 12 so that the fire tube cannot be passed through the opening of the vessel 12.

To control the fire tube assembly 14 during installation and removal so that it remains level and the free end of the fire tube 16 does not dip down, oftentimes, workers will remove the end cap 22 of the inlet and insert a long length of oil field pipe (not shown) into the inlet 18 end of the fire tube 16. The length of pipe may be very long (e.g., 25 feet) to provide sufficient leverage for a worker or workers holding the opposite end to facilitate handling of the heavy fire tube assembly 14. With the fire tube assembly 14 supported by the hoist, a worker will manipulate the length of pipe so that the fire tube 16 remains as level as possible when uncoupled from the heater treater vessel 12. While the distal end 38 of the fire tube 16 may undergo small movements during installation or removal, the movement of the free end of the pipe (not shown) is much larger, creating safety concerns to those nearby if the inserted pipe is not fully controlled.

Furthermore, because the inserted end of the oil field pipe is much smaller in diameter compared to the diameter of the fire tube 16, the inserted end of the pipe will tend to move around within the fire tube 16, hitting and striking the interior walls of the fire tube 16, which may cause damage to the fire tube assembly 14.

Additionally, for each oil well, there may be as many as three to six heater treaters, which may be spaced fairly close together (e.g., 10 to 15 feet), with each heater treater having a fire tube assembly that may need removal and replacement. Equipment and other structures (e.g., oil field equipment and vessels, containment berms, fences, etc.) surrounding the heater treater 10 may also be located nearby. Thus, in many instances there may not be enough room to insert such a long length of pipe into the fire tube assembly 10 to facilitate its control during installation and removal.

Accordingly, a need exists to overcome the aforementioned shortcomings.

BRIEF DESCRIPTION OF THE DRAWINGS

For a more complete understanding of the particular embodiment(s), and the advantages thereof, reference is now made to the following descriptions taken in conjunction with the accompanying figures, in which.

DETAILED DESCRIPTION

Figure 2:
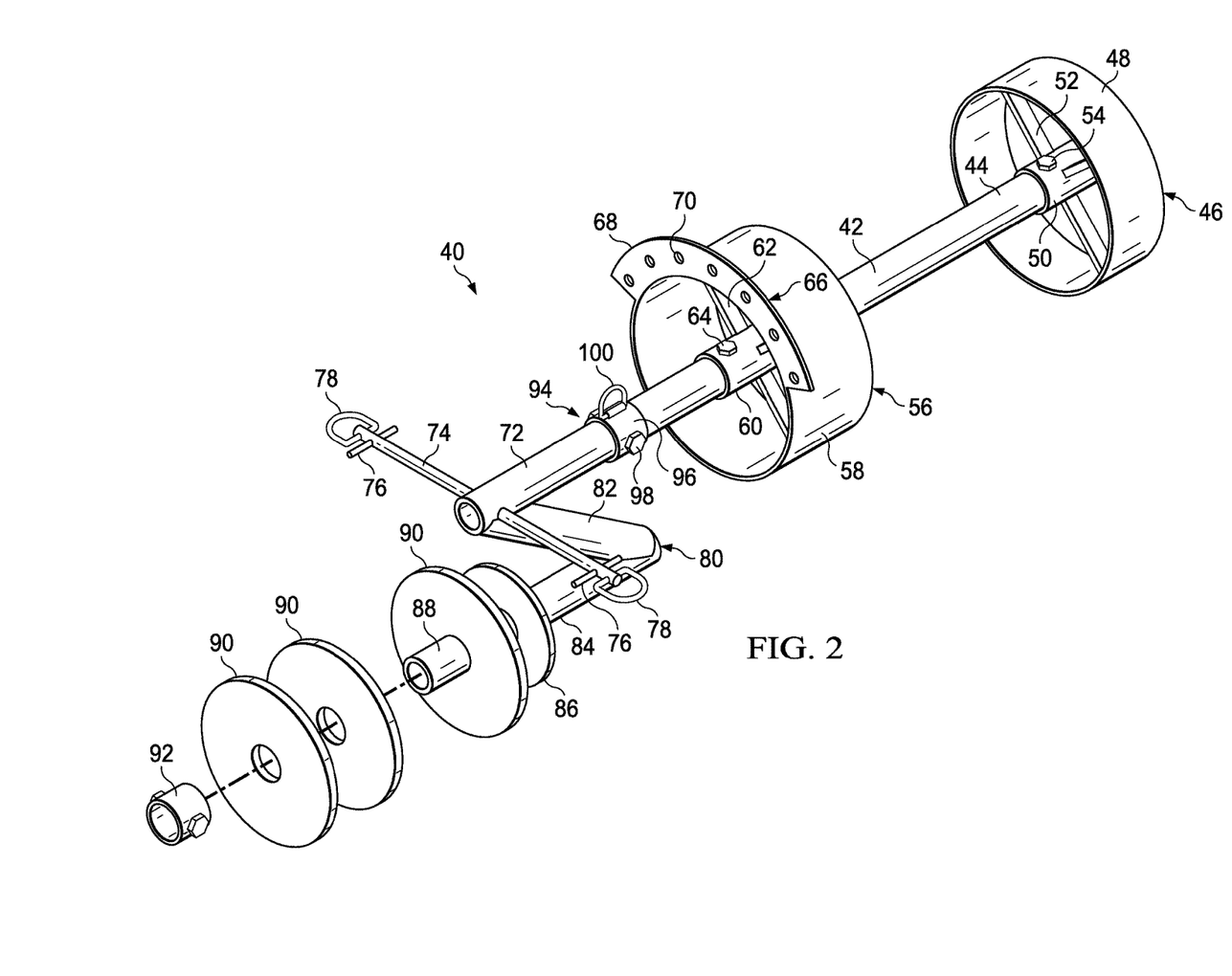
FIG. 2 is a perspective view of a fire tube removal and installation tool for removing and installing a fire tube assembly used with a heater treater, such as the heater treater of FIG. 1.

Referring to FIG. 2, a fire tube installation and removal tool 40 is shown that has been developed to facilitate installation and removal of fire tube assemblies from heater treaters and other heating vessels, such as the fire tube assembly 14 of FIG. 1. The tool 40 may be used for the installation and removal of fire tubes from both vertical and horizontal heater treaters, as well as other heating vessels and equipment that may use similarly configured fire tubes or fire tubes of other configurations.

The tool 40 includes an elongated main shaft 42 having a distal insertion end 44 with a fire tube support 46 mounted on the shaft 42 at or near the insertion end 44. The main shaft 42 is typically formed from steel or other material having sufficient strength to perform the functions described herein. All or a portion of the main shaft member 42 may be tubular or cylindrical in shape and be of hollow or solid construction. As a non-limiting example, a suitable material for the main shaft is a length of 3 inch schedule 80 steel pipe. The length of the main shaft 42 may vary but in many embodiments will range from 5 feet to 10 feet in length, with from 6 feet to 8.5 feet being particularly suitable in many applications. The length of the main shaft 42 may depend upon the length and size of the fire tube, as fire tubes may have different lengths. For vertical fire tubes, the fire tubes commonly have lengths of 4 feet or 6 feet. Fire tubes for horizontal heater treaters may be longer. The length of the main shaft 42 may be configured so that from ¼ to ¾ of the length of the main shaft 42, more particularly from ⅓ to ⅔ of the length of the main shaft 42, projects into the inlet 20 of the fire tube 16 with which it is used when fully engaged and mounted to the fire tube assembly 14, as will be discussed later on. Similarly, the main shaft 42 may extend into the fire tube inlet 20 from ¼ to ¾ of the length of the fire tube, more particularly from ⅓ to ⅔ of the length of the fire tube 16 when mounted thereto.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor(s) appreciates and understands that any and all points within the range are to be considered to have been specified, and that inventor(s) possesses the entire range and all points within the range.

The fire tube support 46 includes an outer member 48 configured to cooperate with the shape of the interior wall of the fire tube 16 into which it is inserted. In most cases the fire tube 16 will have a cylindrical interior to correspond to the circular cross-sectional shape of the fire tube wall interior. Accordingly, the outer member 48 in the embodiment shown is a cylindrical member having a cylinder wall with a length that may range from 1 inch to 18 inches, more particularly from 4 inches to 12 inches. The cylindrical member 48 is closely received within the cylindrical interior of that portion of the fire tube 16 into which it is inserted. The cylindrical member 48 has an outer diameter that is slightly less than the inner diameter of that portion of the fire tube 16 into which it is inserted and locates when the cylindrical member 48 is fully inserted into the fire tube 16. The outer diameter of the cylindrical outer member 48 of the support 46 may be from ⅛ inch to 1 inch less than the inner diameter of that portion of the fire tube 16 into which it is inserted and locates, more particularly from ¼ to ½ inch less than the inner diameter of the fire tube 16. This provides sufficient clearance between the support member 48 and the interior wall of the fire tube 16 to facilitate axial insertion and removal of the support member 46 of the tool 40 within the fire tube 16 while also restricting lateral movement of the support 46 within the interior of the fire tube 16. As an example, a typical interior diameter for a fire tube is 15 inches. Thus, the outer diameter of the outer member 48 may be slightly less than this.

The cylindrical outer member 48 is mounted to a central mounting hub or sleeve 50 through radial extending members or arms 52 that extend from the hub 50. The members 52 are circumferentially spaced apart to provide sufficient support for the outer member 48. In an alternate embodiment, the members 52 may be replaced with one or more of a radially and continuous or non-continuous circumferentially extending support flange or flanges (not show) that extends radially and circumferentially from the hub 50.

The central hub or sleeve 50 mounts to or is coupled to the main shaft 42 at or near the insertion end 44. In certain embodiments, the hub 50 of the fire tube support 46 may be permanently and rigidly fixed to the main shaft 42, such as by welding the hub or sleeve 50 to the main shaft 42. In such permanent and fixed construction, the hub 50 may constitute a portion of the main shaft 42 itself, with the radial member(s) 52 being coupled directly to the main shaft 42.

In some embodiments, the support 46 may releasably mount at a single axial or longitudinal position on the main shaft 42. In other embodiments, however, the support member 46 may be mounted at different selected axial or longitudinal positions upon the insertion end 44 of the shaft 42. The hub or sleeve 50 may be releasably and movably mounted to the shaft 42 to facilitate this. One or more fasteners 54, such set screw, bolt or other device is provided with the hub or sleeve 50 for releasably coupling the fire tube support 46 upon the main shaft 42 so that the support 46 maintains its position on the shaft 42 when the fastener 54 is fully engaged with the shaft 42. By loosening the fastener 54 so that it disengages from the shaft 42, the support 46 can be moved along the length of the shaft 42. The fastener 54 may secure the support 46 to the shaft through frictional engagement and/or a cooperating recess, aperture, bolt hole or other structure (not shown) may be provided on the shaft 42 to facilitate securing the support 46 to the shaft 42 at selected positions. In many instances, the fastener 54 will utilize frictional engagement so that the support 46 can be moved to continuously variable positions. Additionally, the support 46 may releasably mount to different rotational positions upon the shaft 42 in some embodiments.

A second support 56 is axially or longitudinally spaced from the support 46 along the main shaft member 42. The second support 56 may be constructed the same or similarly to the support 46 and include an outer support member 58, a central mounting hub or sleeve 60, and radially extending member(s) or arms 62. The support 56 may be permanently and rigidly fixed to the main shaft 42 or may be releasably and movably mounted to the shaft 42 in a similar manner to that described for the support 46. A fastener or fasteners 64 may be provided for releasably securing the support 56 to the shaft 42. The fastener or fasteners 64 may secure the support 56 to the shaft 42 through frictional engagement and/or through cooperating recesses, apertures, bolt holes or other structures (not shown), which may be provided at different positions to allow the support 56 to be mounted at different selected axial or longitudinal positions. In certain instances, the fastener 64 will utilize frictional engagement so that the support 56 can be moved to continuously variable positions upon the shaft 42. Additionally, the support 56 may releasably mount to different rotational positions upon the shaft 42 in some embodiments.

The outer cylindrical member 58 of the support 56 constitutes a fire tube insertion portion of the support 56 and may have a cylinder wall with a length of from 1 inch to 20 inches, more particularly from 4 inches to 15 inches. In certain embodiments, the length of the cylinder wall of the cylindrical member 58 may be greater than that of the support member 46.

The cylindrical member 58 is closely received within the cylindrical interior of the inlet portion of the fire tube 16 into which it is inserted, as will be described further on. The cylindrical member 58 also has an outer diameter that is slightly less than the inner diameter of the inlet portion of the fire tube 16 into which it is inserted and locates when the cylindrical member 58 is fully inserted into the inlet of the fire tube 16. The outer diameter of the cylindrical outer member 58 of the support 56 may be from ⅛ inch to 1 inch less than the inner diameter of the inlet portion of the fire tube 16 into which it is inserted and locates, more particularly from ¼ to ½ inch less than the inner diameter of the fire tube 16. This provides sufficient clearance between the support member 58 and the interior wall of the fire tube 16 to facilitate axial insertion and removal of the support member 56 of the tool 40 within the fire tube 16 while also restricting or limiting lateral movement of the support 56 within the interior of the fire tube 16.

The support 56 further includes an engagement portion 66 that interfaces with and engages the fire tube 16 without requiring insertion of the engagement portion 66 into the interior of the fire tube 16. The engagement portion 66 in the embodiment shown constitutes a circumferentially extending flange 68. The flange 68 projects radially outward from the outer surface or edge of the outer cylindrical support member 58. The flange 68 may extend around all or a portion of the circumference of the outer cylindrical member 58 or may be formed in one or more projecting mounting tabs (not shown) that are circumferentially spaced apart. In this case the flange 68 circumferentially extends around half or less than half of the upper end or side of the member 58. The flange 68 is positioned at or near the edge of the outer member 58 that is opposite from the insertion end 44 of the main shaft 42 so that substantially all or a majority of the length of the outer cylindrical member 58 can be inserted into the fire tube 16, as will be discussed later on.

The flange 68 is configured to cooperate with structures of the fire tube 16 to facilitate engagement with and/or supporting of the fire tube 16. This may include mounting flanges of the fire tube assembly 14, such as the mounting flange 24 (FIG. 1) of the inlet 22 of the fire tube 16. The flange 68 is shown provided with holes, apertures or other mounting structures 70 that are configured to cooperate and/or engage with cooperating structures of the fire tube 16. This can include bolt holes provided in both the mounting flange 68 of the support 56 and the mounting flange 22 of the fire tube inlet 20, which are similarly sized and arranged to facilitate the operations described herein. Bolts, screws or other fasteners are used to secure the flange 68 to the mounting flange 24 to prevent relative rotational movement between the fire tube assembly 14 and the tool 40 about the longitudinal axis of the main shaft 42 when the tool 40 is inserted into the fire tube 16. When used to prevent rotational movement, fewer than all bolt holes or apertures 70 (e.g., 2 to 4) may be used to facilitate this. In certain embodiments, the flange 24 may be rotated to a desired position relative to the shaft 42 to facilitate alignment where the support 46 is releasably mountable to different rotational positions upon the shaft 42, as described earlier.

As will be appreciated, in certain alternate embodiments the support 56 may be formed entirely of the mounting flange 68, with the cylindrical outer member 58 being eliminated. In such embodiments, the mounting flange 68 would be used to securely fasten the tool 40 to the mounting flange 24 of the inlet. In such instances, a greater number or all of the bolt holes or apertures 70 of the mounting flange 68 may be used because the flange 68 serves as the entire support 56.

The support 56 is located at an axial or longitudinal position upon the main shaft 42 between the distal insertion end 44 and a proximal control end 72 of the main shaft 42, which is opposite the insertion end 44. The support 56 may be located at a position along the length of the main shaft 42 so that from ¼ to ¾ of the length of the main shaft 42, more particularly from ⅓ to ⅔ of the length of the main shaft 42, projects into the inlet 20 of the fire tube 16 with which it is used when the flange 68 is mounted to or abuts against the mounting flange 24 of the fire tube inlet 20.

Located at or near the proximal control end 72 of the main shaft is one or more control handle arms 74. In the embodiment shown, there are two control handle arms 74 that extend laterally or radially away from the main shaft member 42. In the embodiment shown the handles 74 are oriented 180 degrees apart, although they may be oriented at different angles (e.g., from 90 to 180 degrees) relative to one another. The handles 74 may have a length of from 6 to 18 inches and may be provided with hand grips 76 so that the handles 74 may be manually grasped for manipulating the control end of the tool 42. Additionally, the handles 74 may be provided with line couplings 78 that facilitate coupling the handles 74 to a tagline or rope so that the control end of the tool 40 can be manipulated and controlled remotely through such line or rope for safety purposes. The coupling 78 may be a ring, D-ring or other device configured for coupling to a tagline or rope. In other embodiments, a line coupling (not shown) may be provided at other positions on the control end of the tool 40, such as the control end 72 of the main shaft 42.

The tool 40 further includes a counterbalance support assembly 80. The counterbalance support assembly 80 is coupled to the main shaft 42 by a counterbalance support spacing arm or member 82 that is coupled at one end to the main shaft 42 at or near the control end 72 and extends radially or laterally away from the main shaft member 42, as shown. This may be in a downward direction or a direction opposite from the side the mounting flange 68 provided on the upper side of the support 56. The spacing arm 82 may extend from the main shaft 42 at a position from 90 degrees to 180 degrees circumferentially spaced from the center of the upper end of the support 56. In the embodiment shown, the spacing arm 82 also extends axially or longitudinally away from the control end 72 of the main shaft 42 a distance toward the insertion end 44 so that the spacing arm 82 is oriented diagonally with respect to the main shaft 42. The angle of the longitudinal axis of the spacing arm relative to the longitudinal axis of the main shaft may range from 30 to 90 degrees, more particularly from 30 to 60 degrees, and still more particularly from 40 to 50 degrees. The spacing arm 82 may have a length of from 12 inches to 36 inches, with from 18 inches to 30 inches being particularly useful.

The counterbalance support assembly 80 further includes a counterbalance support arm or member 84 that extends from the end of the spacing arm 82 opposite the main shaft 42. In the embodiment shown, the support arm 84 extends in a direction away from the insertion end 44 of the main shaft with the longitudinal axis of the support arm 84 so that axial lines passing through the main shaft 42, the spacing arm 82 and the support arm 84 have a generally zigzag or z-shaped configuration. In such a configuration, longitudinal axis of the support arm 84 may be at an angle generally parallel to the longitudinal axis of the main shaft 42, although it may have other orientations. In such zigzag orientations where the support arm 84 extends away from the insertion end 44, the angle of the longitudinal axis of the support arm 84 to the longitudinal axis of the spacing arm 82 may range from 30 to 90 degrees, more particularly from 30 to 60 degrees, and still more particularly from 40 to 50 degrees. In many applications, the angle of the longitudinal axis of the support arm 84 to the longitudinal axis of the spacing arm 82 will be equal or near equal (i.e., from 10 degrees or less deviation) from the angle of the longitudinal axis of the spacing arm 80 to the longitudinal axis of the main shaft 42 so that the support arm 84 remains parallel or near parallel to the main shaft 42.

Each of the spacing arm 82 and support arm 84 may be of tubular or cylindrical configuration that is the same or similar size (i.e., width or diameter) and shape as the main shaft 42 and may be hollow or solid and may be formed from the same materials (e.g., 3 inch schedule 80 pipe). In certain embodiments, the components making up the support arm assembly 80 may be different, such as being smaller diameter tubular or cylindrical materials (e.g., 2 inch schedule 80 pipe).

Provided on the support arm 84 is a weight abutment member or plate 86. This may be a round or disk-shaped member that is centered on and permanently or releasably fixed to the support arm 84. A weight support shaft 88 extends from the abutment plate 86. The weight support shaft 88 may be a continuation of the support arm 84 that projects from member or plate 86 or may be a separate member. The weight support shaft 88 is configured to receive and support a set of individual weighting members 90 when positioned thereon. In this regard, the shaft 88 and/or support arm 84 may be of a size and shape suitable for receiving and carrying such weighting members 90. The weighting members 90 may be heavy plate members (e.g., 25 lbs to 80 lbs) that are sized and weighted to be used with the tool 40 to provide sufficient counterbalancing weight. The set of weighting members 90 can contain a number of weighting members of the same or different weights, small or large, to allow a selected desired amount of weight to be positioned on the counterbalance support assembly 80. In one embodiment, the weighting members 90 may be conventional weight lifting weights, such as Olympic-type weights that typically are available in weights of 45 lbs, 35 lbs, 25 lbs, 10 lbs., etc. and have 2 inch central openings for positioning on the support shaft 88.

A removable securing device 92, such as a releasable clip or collar, is provided with the weight support assembly 80 that mounts on the shaft 88 to retain the weighting members 90 in place upon the shaft 88.

The entire length of the support arm 84 and shaft 88 may range from 18 inches to 36 inches, more particularly from 20 inches to 30 inches. The length of the weight support shaft 88 portion of the support arm 84 may range from 10 inches to 32 inches, more particularly from 12 to 20 inches.

Figure 3:
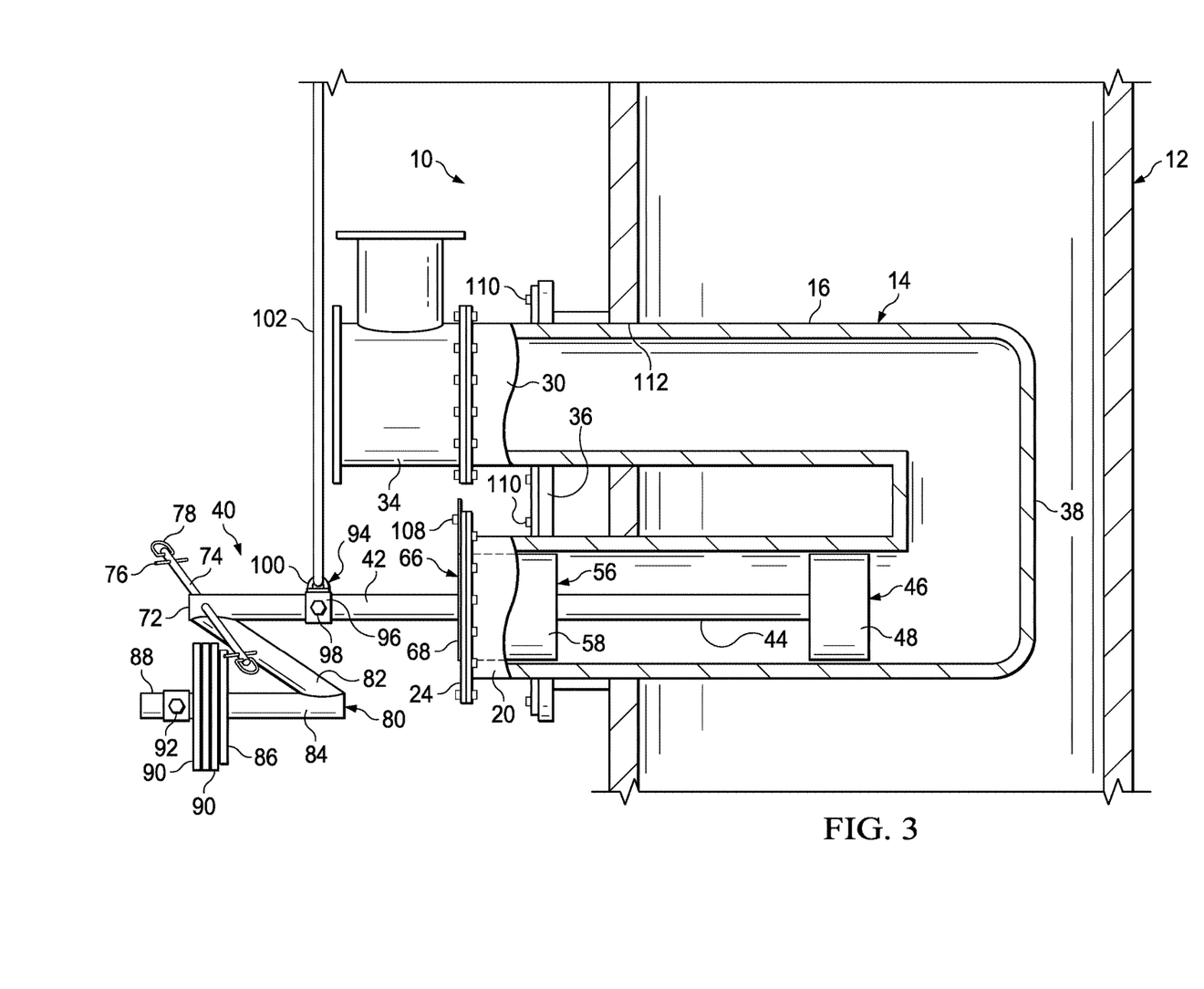
FIG. 3 is an elevational view of the fire tube removal and installation tool of FIG. 2, shown coupled to the fire tube assembly of the heater treater of FIG. 1 and with the heater treater and fire tube assembly in cross section.

Referring to FIG. 3, because of the zigzag or Z-shaped configuration of the weight support assembly 80, the end of the support arm 84 or shaft 88 does not extend past or extends longitudinally beyond the control end 72 of the main shaft 42 a very short distance. This distance may be 36 inches, 30 inches, 24 inches, 18 inches, 12 inches, or 6 inches or less. In many instances, the end of the support arm 84 or shaft will extend less than 12 inches or 6 inches beyond the control end 72 to minimize the overall length of the tool 40. In certain instances, the end of the support arm 84 or shaft 88 may be positioned longitudinally even with the control end 72 of the main shaft 42 or even longitudinally behind the control end 72 of the main shaft 42. This configuration facilitates shortening of the length of the tool 40 so that it can be used in small and confined areas.

Positioned on the main shaft 42 between the control end 72 and the support 56 is a lift coupling 94. The lift coupling 94 may include a sleeve 96 that is mounted upon the shaft 42 and may be permanently fixed at a certain axial or longitudinal position on the shaft 42 or be selectively movable axially or longitudinally along the length of the shaft 42 at different positions. In most applications, the lift coupling 94 will be movable coupled to the shaft 42 to allow it to be moved to different axial or longitudinal positions. This allows the coupling 94 to be positioned at or as near as possible to the center of mass of the tool 40 itself or the combined tool 40 and fire tube assembly 14 when the fire tube assembly 14 is mounted on and supported by the tool 40. Markings or other indicia (not shown) may be provided on the shaft 42 to indicate typical positions for the center of mass for positioning the coupling 94 when the tool 42 is lifted without and with a fire tube assembly mounted thereon. The sleeve 96 may be provided with a set screw, bolt or other fastener(s) 98 that engages the main shaft 42 to facilitate releasably coupling the lift coupling 94 to the shaft 42. The fastener or fasteners 98 may secure the coupling 94 to the shaft 42 through frictional engagement and/or through cooperating recesses, apertures, bolt holes or other structures (not shown), which may be provided at different positions on the shaft 42 to allow the coupling 94 to be mounted at different selected axial or longitudinal positions. In certain instances, the fastener 98 will utilize frictional engagement so that the coupling 94 can be moved to continuously variable positions upon the shaft 42.

The coupling 94 may include a ring, D-ring or other device 100 configured for coupling to a line, strap, or chain of a hoist or crane for lifting the tool 40 and fire tube assembly 14. The coupling 94 may be releasably and rotatably mounted upon the shaft 42 so that the ring or device 100 can be oriented in a desired selected circumferential position and then secured to prevent rotational movement. In certain instances, the coupling 94, when secured or fixed in a desired axial or longitudinal position upon the shaft 42, may continue to be rotatably movable upon the shaft 42 so that the ring or device 100 is free to rotate around the shaft 42 while maintaining its axial or longitudinal position to prevent the line, strap, or chain secured to the coupling 94 from becoming twisted around the shaft 42.

In certain instances, the lift coupling 94 may simply be a portion of the main shaft 42 itself around which a line, strap or chain is secured.

Figure 4:
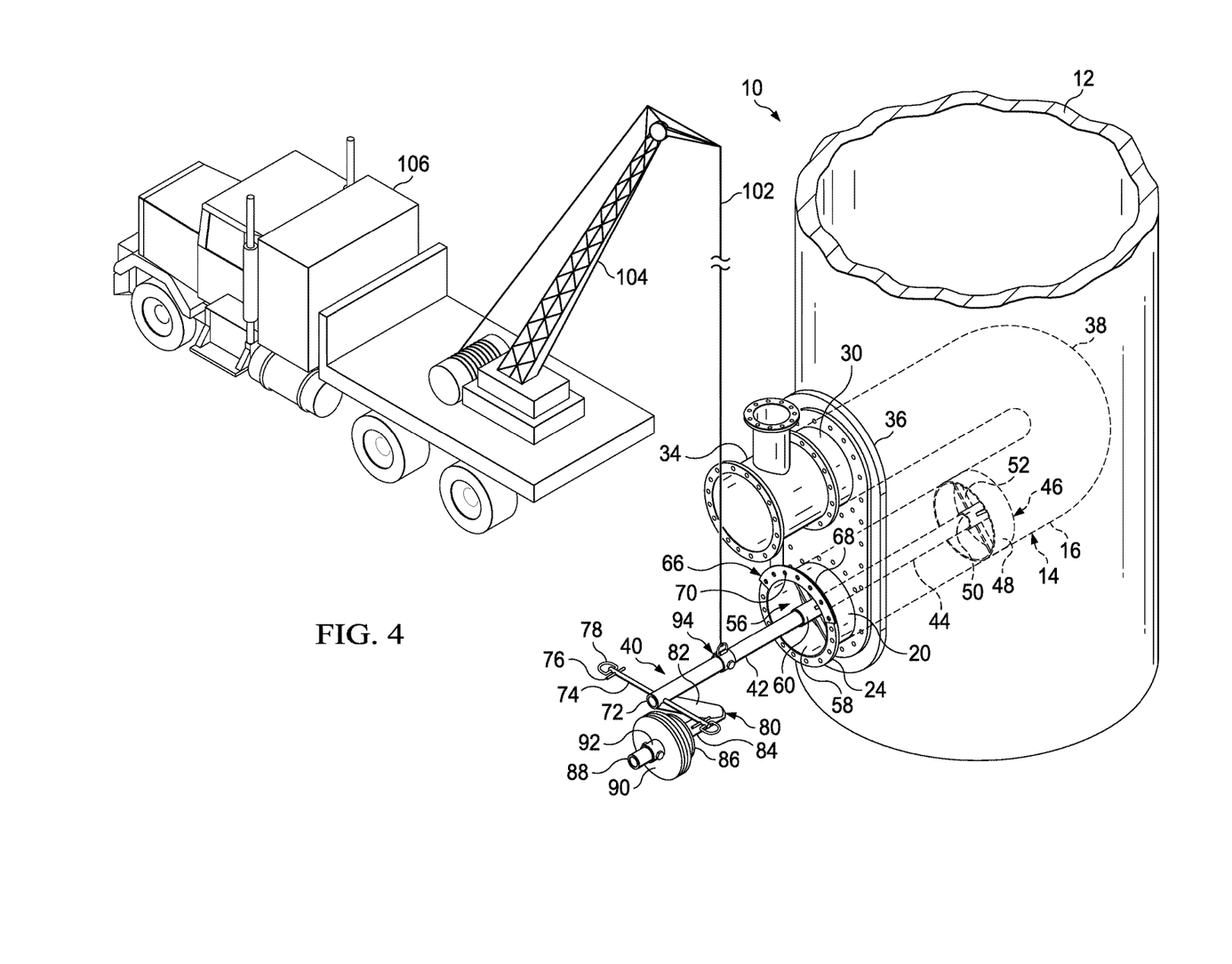
FIG. 4 is a perspective view of the fire tube removal and installation tool of FIG. 2, shown in the course of inserting or withdrawing the tool from the fire tube assembly of FIG. 1.

Referring to FIG. 4, in use, a line, strap, or chain 102 suspended by a hoist or crane 104, which may be mounted on a vehicle, truck, or other mobile equipment 106 (e.g., digger derrick, cherry picker, forklift, etc.) is secured to the D-ring 100 of the lift coupling 94. When so coupled, the tool 40 may be lifted by the hoist 104 and moved to the desired location. Weighting members 90 may be added or removed from the shaft 88 of the weight support 80 to facilitate keeping the tool 40 in a generally level or horizontal orientation. If necessary, the lift coupling 94 may also be moved along the shaft 42 to a position closer to the center of gravity of the tool 40 so that the tool 40 is balanced about the coupling 94.

Referring to FIG. 1, to remove an existing fire tube assembly 14 from a heater treater vessel 12, the fire tube exhaust 32 is uncoupled from the elbow 34 and moved away from the fire tube assembly 14, as shown in FIGS. 3 and 4.

Similarly, the end cap 22 of the fire tube inlet 20 is removed and the fuel line 26 uncoupled from the inlet 20 of the fire tube assembly 14. At this point, the fire tube assembly 14 may still be mounted to the heater treater vessel 12 through the mounting flange 36, where the inlet 20 and outlet 30 of the fire tube 16 are mounted to the heater treater vessel 12. The end of the fire tube 16 where the inlet 20 and outlet 30 are mounted to the heater treater vessel 12 may constitute a mounting end of the fire tube 16 or fire tube assembly 14.

With the tool 40 supported by the hoist or crane, it may then be and moved into position adjacent to the fire tube assembly 14 and the insertion end 44 with the support member 48 thereon is inserted through the uncapped inlet 20 and into the fire tube 16, as shown in FIG. 4. The tool 40 may be guided and controlled by means of the handles 74, which may be manually grasped through the hand grips 76 or remotely by a tagline or lines (not shown) attached to the line couplings 78. The outer support 58 of support 56 may also be inserted into the inlet 20 of the fire tube 16. The flange 68 of the support 56 interfaces with and is positioned against the mounting flange 24 of the inlet 20 and oriented so that the apertures 70 are aligned with openings or apertures of the flange 24. Bolts or other fasteners 108 (FIG. 3) are inserted into the aligned apertures to prevent rotational movement of the fire tube, as well as to secure the tool 40 to the fire tube assembly 14.

When the tool 40 is fully mounted to the fire tube assembly 14, the fire tube assembly may be uncoupled or unsecured from the mounting flange 36 by removal of any bolts or fasteners 110. To account for the added weight of the fire tube assembly 14, weighting members 90 can be added to the support shaft 88 of the weight support 80 to keep the tool 40 and fire tube assembly 14 level or horizontal so that the free end 38 of the fire tube 16 does not dip down, as with prior art methods. Additionally, the lift coupling 94 can be moved and positioned along the shaft 42 to a position nearer to or at the new center of gravity created by the weight added to the tool 40 by the fire tube assembly 14 to balance and facilitate maintaining the tool 40 and fire tube assembly 14 in a generally level or horizontal position.

The tool 40 and fire tube assembly 14 may then be withdrawn through the opening 112 in the wall of heater treater vessel 12 so that the fire tube assembly 14 is removed from the vessel 12. Because the cylindrical support members 48 and 58 are closely received within the interior of the fire tube 16, there is limited lateral movement of the fire tube assembly 14 relative to the tool 40 so that there is no damage to the interior walls of the fire tube assembly 14 during its removal.

For installation of the fire tube assembly 14 using the tool 40 the process is reversed. The insertion end 44 of the tool 40 with the support member 48 thereon is inserted through the uncapped inlet 20 and into the fire tube 16 being installed. The tool 40 may be guided and controlled by means of the handles 74, which may be manually grasped through the hand grips 76 or remotely by a tagline or lines (not shown) attached to the line couplings 78. The outer cylindrical support member 58 of support 56 is also inserted into the inlet 20 of the fire tube 16 to be installed. The flange 68 of the support 56 interfaces with and is positioned against the mounting flange 24 of the inlet 20 of the fire tube assembly 14 and oriented so that the apertures 70 are aligned with openings or apertures of the flange 24. Bolts or other fasteners 108 (FIG. 3) are inserted into the aligned apertures to prevent rotational movement of the fire tube 16, as well as to secure the tool 40 to the fire tube assembly 14.

To account for the added weight of the fire tube assembly 14 being installed, weighting members 90 can be added to the support shaft 88 of the weight support 80 for balance to keep the tool 40 and fire tube assembly 14 level or horizontal so that the free end 38 of the fire tube 16 does not dip down, as with prior art methods. Additionally, the lift coupling 94 can be moved and positioned along the shaft 42 to a position nearer to or at the new center of gravity created by the weight added to the tool 40 by the fire tube assembly 14 to balance and facilitate maintaining the tool 40 and fire tube assembly 14 in a generally level or horizontal orientation.

The tool 40 and fire tube assembly 14 may then be inserted and passed through the opening 112 in the wall of heater treater vessel 12 so that the fire tube assembly 14 is positioned within the vessel 12. Because the cylindrical support members 48 and 58 are closely received within the interior of the fire tube 16, there is limited movement of the fire tube assembly 14 relative to the tool 40 so that there is no damage to the fire tube assembly 14 during its installation.

When the fire tube assembly 14 is fully positioned within the heater treater vessel 12, the fire tube assembly 14 may be coupled or secured to the mounting flange 36 by bolts or fasteners 110. The bolts or other fasteners 108 (FIG. 3) used to secure the mounting flange 68 to the flange 24 of the inlet 20 of the fire tube 16 are then uncoupled and removed and the tool 40 is withdrawn from the fire tube 14, with the support members 48 and 58 being withdrawn out of the interior of the fire tube 14. If necessary, weighting members 90 can be removed from the shaft 88 and/or the coupling 94 can be moved to the new center of gravity to account for the decrease in weight of the insertion end 44 of the tool with the fire tube assembly 14 removed.

Because the tool 40 has a limited length, it can be used in fairly confined areas while providing sufficient balancing and leverage to maintain the fire tube assembly 14 in a generally level or horizontal orientation throughout both its installation or removal.

While the removal and installation of the fire tube assembly 14 is described with respect to inserting the tool 40 into the inlet 20 of the fire tube 16, in some embodiments, the fire tube 40 may be inserted into the fire tube outlet 30 to facilitate installation and removal.

Figure 5:
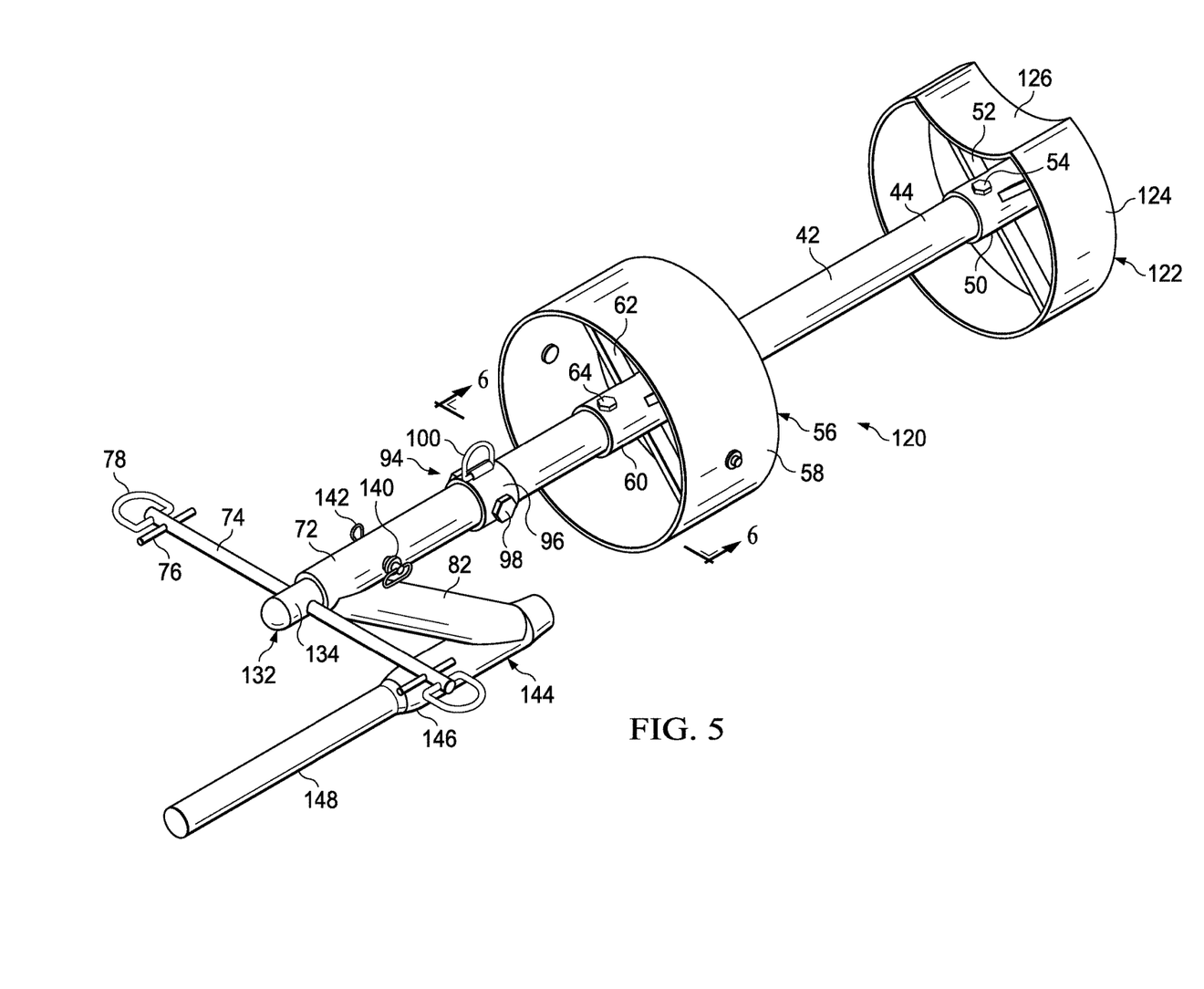
FIG. 5 is a perspective view of another embodiment of a fire tube removal and installation tool for removing and installing a fire tube assembly used with a heater treater, such as the heater treater of FIG. 1.

Referring to FIG. 5, an alternate embodiment of a fire tube installation and removal tool 120 is shown. The tool 120 is similar in construction to the tool 40, previously described, with similar components labeled with the same reference numerals. The tool 120 includes a fire tube support 122 mounted on the shaft 42 at or near the insertion end 44. The support 122 differs from the support 46 in that it is provided with an insertion support member 124 that includes a recessed portion 126 in the form of a concavity formed in the member 124. There may be more than one recessed portion 126, with the recessed portions being spaced apart on the support member 124. The recessed wall portion 126 provides a clearance area to accommodate projections, such as dents, damaged areas, or other obstructions, which may project into the interior of the fire tube 16 that would otherwise prevent full insertion of the support 122 into the tube interior of the fire tube 16. The recessed portion 126 may be oriented in a selected circumferential position upon the shaft 42 by means of releasing the fastener 54 and rotating the support 122 to the desired position and then securing support 122 with fastener 54.

In a variation, the recessed wall portion 126 may be eliminated (not shown) so that there is one or more gap or gaps circumferentially spaced in the cylindrical support member 124 so that the cylindrical support member 124 is not continuous. This provides spaces or areas to accommodate obstructions in the interior of the fire tube 16. Moreover, in some embodiments, the cylindrical member 38 may be eliminated entirely and the fire tube support of the insertion end 44 may be formed by the radial members 52 themselves, which would extend to an appropriate distance to engage the interior walls of the fire tube 16. In such cases, the radial arms 52 may be provided with pads or other members (not shown) on their ends that engage the interior wall of the fire tube 16. The radial members 52 may be spaced apart a sufficient distance to accommodate obstructions within the fire tube 16.

Although not shown, the second support 56 may be configured similarly to the support 122, with a recess(es), gaps, or elimination of the cylindrical member 58 entirely so that that radial arms 62 engage the interior of the fire tube 16, as discussed with respect to the support 122.

Figure 6:
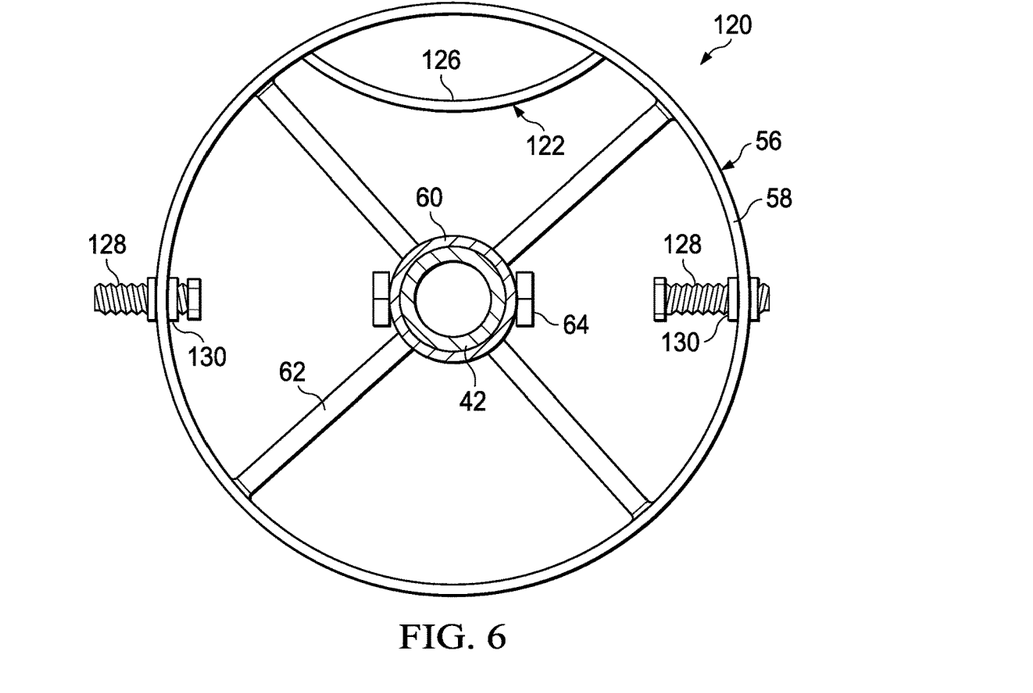
FIG. 6 is an elevational end view of the fire tube removal and installation tube of FIG. 5, taken along the lines 6-6.

The support 56 of the tool 120 also differs from that of the tool 40 by the elimination of the mounting flange 66. Referring to FIG. 6, the support member 58 of support 56 is provided with bolts or set screws 128 that project through a nut or threaded openings 130 seated or provided in the wall of the support member 58. The bolt(s) 128 may be from 2 to 4 inches in length and be located at positions on the support member 58 so that the bolts can be engaged with a wrench or tool for extending or retracting the bolts 128 when the tool 120 is inserted into the fire tube 16. When inserting the tool 126 into the fire tube 16, the bolts 128 are initially retracted a distance into the interior of the support member 58. After the tool 126 is fully inserted into the fire tube 16, the bolts 128 are rotated until they extend outward and engage the interior walls of the fire tube 16 to prevent relative rotation and movement of the fire tube 16 upon the tool 120. This also eliminates the need to align any bolt holes of a mounting flange of the tool 120 with the mounting flange 24 of the fire tube assembly 14.

Figure 7:
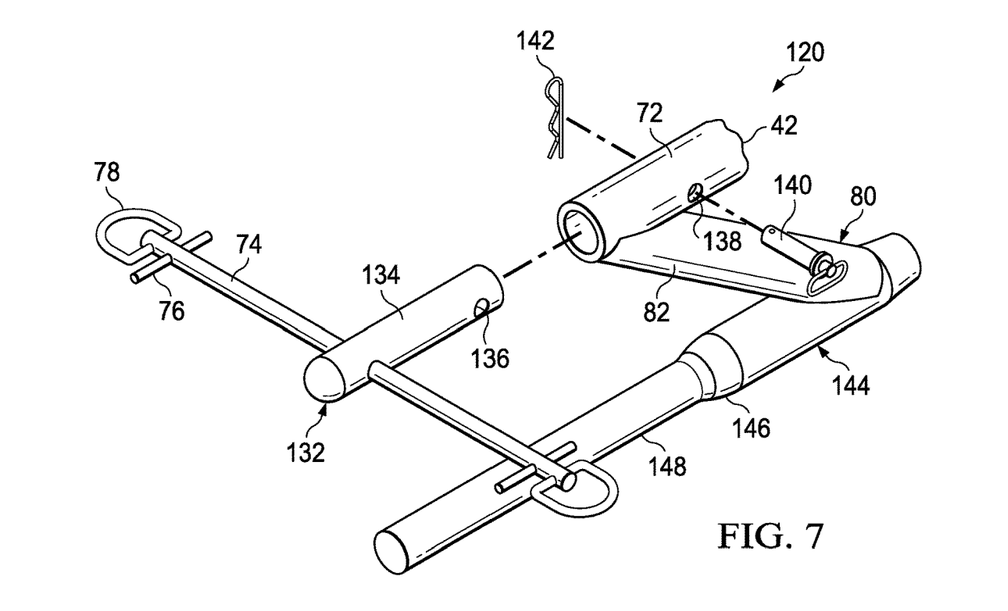
FIG. 7 is an enlarged perspective view of a control end of the fire tube removal and installation tool of FIG. 5, shown with a handle assembly of the tool exploded away.

Referring to FIG. 7, the tool 120 also includes a removable handle assembly 132. The handle assembly 132 includes a shaft member 134 on which the handles 74, hand grips 76, and line couplings 78, as with the tool 40, are provided. The shaft 134 of the handle assembly 132 is sized and configured to be received within a central opening 136 in the control end 72 of the main shaft 42. The shaft member 134 includes a transverse passage or hole 136 that corresponds to aligned apertures or holes 138 formed in the control end 72 of the shaft 42, for securing with a clevis pin 140 and cotter or split pin 142 or other releasable fastener to retain the shaft 134 upon the control end 72 of the main shaft 42. In this way, once the tool 120 is mounted to the fire tube 16, the handle assembly 132 can be completely removed from the tool 120 so that it is out of the way and remounted when needed.

The counterbalance support assembly 80 of the tool 120 also differs from that of tool 40 in that it further includes a counterbalance support arm or member 144 having a swaged or necked down portion 146 that extends from the end of the spacing arm 82 to a support shaft 148 of reduced diameter to receive the weights 90. Thus, for example, while the portion of the support arm 144 joining the spacing arm 82 may have a larger diameter (e.g., 3 inches) the support shaft 148 may have a smaller diameter (e.g., 2 inches). This may enable the shaft 138 to receive weights that are commonly available, such as the Olympic weight plates that are typically provided with smaller 2 inch central openings.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A tool for removal and installation of a fire tube that extends into an opening in a wall of a heating vessel, the fire tube locating within an interior of the heating vessel when mounted thereto, the fire tube having a tube wall that defines a tube interior and having a mounting end for mounting the fire tube to the wall of the heating vessel, the tool comprising:
    an elongated main shaft member having an insertion end and an opposite control end;
    a first support mounted upon the insertion end that is configured for being closely received within the tube interior;
    a second support mounted along the length of the main shaft member, the second support having a fire tube interface configured for engaging and releasably coupling to the mounting end of the fire tube;
    a lift coupling coupled to the main shaft and being located between the second support and the control end of the main shaft member for coupling to a lift line; and
    a counterbalance support for carrying removable weighting members, the counterbalance support being coupled to the main shaft by a counterbalance support spacing arm that extends laterally from the main shaft member.

2. The tool of claim 1, further comprising:
    a control handle that extends from the control end of the main shaft member.

3. The tool of claim 2, wherein:
    the control handle is removable coupled the control end of the main shaft member.

4. The tool of claim 1, wherein:
    the lift coupling releasably couples to the main shaft and is movable thereon when released so that the lift coupling is movable to selected positions upon the main shaft.

5. The tool of claim 1, wherein:
    the counterbalance support is located laterally adjacent to the control end of the main shaft member.

6. The tool of claim 1, further comprising:
    a set of weighting members that are positionable upon the counterbalance support to facilitate counterbalancing the fire tube when the fire tube is fully supported upon the tool.

7. The tool of claim 1, wherein:
    the first support is configured as a cylindrical member.

8. The tool of claim 1, wherein:
    the first support is configured with a clearance to accommodate projecting obstructions within the tube interior.

9. The tool of claim 1, wherein:
    the second support includes a mounting flange and fire tube insertion portion, the mounting flange being configured for engaging the mounting end of the fire tube and the insertion portion being configured for being closely received within the fire tube interior at the mounting end.

10. The tool of claim 9, wherein;
    the fire tube insertion portion is configured as a cylindrical member.

11. A method of at least one of removing and installing a fire tube that extends into an opening in a wall of a heating vessel, the fire tube locating within an interior of the heating vessel when mounted thereto, the fire tube having a tube wall that defines a tube interior and having a mounting end for mounting the fire tube to the wall of the heating vessel, the method comprising:
- with a fire tube removal and installation tool, the tool comprising:
  - an elongated main shaft member having an insertion end and an opposite control end;
  - a first support mounted upon the insertion end that is configured for being closely received within the tube interior;
  - a second support mounted along the length of the main shaft member, the second support having a fire tube interface configured for engaging and releasably coupling to the mounting end of the fire tube;
  - a lift coupling coupled to the main shaft and being located between the second support and the control end of the main shaft member for coupling to a lift line; and
  - a counterbalance support for carrying removable weighting members, the counterbalance support being coupled to the main shaft by a counterbalance support spacing arm that extends laterally from the main shaft member;
- performing at least one of (A) and (B), wherein:
  - (A) comprises removing the fire tube from the heating vessel, (A) comprising:
    - positioning a fire tube removal tube adjacent to the fire tube to be removed:
    - securing a lift line to the lift coupling to facilitate lifting and moving the fire tube removal and installation tool;
    - with the fire tube extending into and being supported and secured within the heating vessel, inserting the first support of the fire tool removal and installation tool into the tube interior from the mounting end of the fire tube;
    - engaging the fire tube interface with the mounting end of the fire tube and coupling the fire tube interface to the mounting end of the fire tube;
    - positioning at least one weighting member on the counterbalance support;
    - unsecuring the fire tube from the heating vessel; and
    - with the fire tube supported on the fire tube removal and installation tool, withdrawing the fire tube through the opening of the wall of the heating vessel so that the fire tube is removed from the heating vessel; and
  - (B) comprises installing the fire tube in the heating vessel, (B) comprising:
    - inserting the first support of the fire tool removal and installation tool into the tube interior from the mounting end of the fire tube to be installed;
    - engaging the fire tube interface with the mounting end of the fire tube and coupling the fire tube interface to the mounting end of the fire tube;
    - positioning at least one weighting member on the counterbalance support;
    - securing a lift line to the lift coupling to facilitate lifting and moving the fire tube removal and installation tool;
    - with the fire tube supported on the fire tube removal and installation tool, inserting the fire tube through the opening of the wall of the heating vessel so that the fire tube is located within the heating vessel;
    - securing the fire tube to the heating vessel; and
    - uncoupling the fire tube removal and installation tube from the fire tube; and
    - withdrawing the first support of the fire tool removal and installation tool from the tube interior from the mounting end of the fire tube.

12. The method of claim 11, wherein:
a control handle extends from the control end of the main shaft member to facilitate controlling movement of the fire tube removal tool during removal and installation.

13. The method of claim 12, wherein:
the control handle is removable coupled the control end of the main shaft member.

14. The method of claim 11, wherein:
the lift coupling releasably couples to the main shaft and is movable thereon when released so that the lift coupling is movable to selected positions upon the main shaft to facilitate locating the lift coupling at or near the center of gravity of the fire tube removal tool when the fire tube is fully supported on the fire tube removal and installation tool.

15. The method of claim 11, wherein:
the counterbalance support is located laterally adjacent to the control end of the main shaft member.

16. The method of claim 11, wherein:
the fire tube removal and installation tool further comprises a set of weighting members that are positionable upon the counterbalance support to facilitate counterbalancing the fire tube when the fire tube is fully supported upon the tool.

17. The method of claim 11, wherein:
the first support is configured as a cylindrical member.

18. The method of claim 11, wherein:
the first support is configured with a clearance to accommodate projecting obstructions within the tube interior.

19. The method of claim 11, wherein:
the second support includes a mounting flange and fire tube insertion portion, the mounting flange being configured for engaging the mounting end of the fire tube and the insertion portion being configured for being closely received within the fire tube interior at the mounting end.

20. The method of claim 19, wherein;
the fire tube insertion portion is configured as a cylindrical member.

* * * * *